United States Patent
Kurian et al.

(10) Patent No.: US 12,380,070 B2
(45) Date of Patent: *Aug. 5, 2025

(54) PREDICTIVE VALUE ENGINE FOR LOGICAL MAP GENERATION AND INJECTION

(71) Applicant: Bank of America Corporation, Charlotte, NC (US)

(72) Inventors: Manu Kurian, Dallas, TX (US); Albena N. Fairchild, Spruce Pine, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/650,248

(22) Filed: Apr. 30, 2024

(65) Prior Publication Data

US 2024/0281415 A1 Aug. 22, 2024

Related U.S. Application Data

(63) Continuation of application No. 17/683,802, filed on Mar. 1, 2022, now Pat. No. 12,013,825.

(51) Int. Cl.
*G06F 16/21* (2019.01)

(52) U.S. Cl.
CPC .................. *G06F 16/213* (2019.01)

(58) Field of Classification Search
CPC ..................................... G06F 16/213
USPC ........................................ 707/673
See application file for complete search history.

(56) References Cited

U.S. PATENT DOCUMENTS

| | | | |
|---|---|---|---|
| 5,684,959 A | 11/1997 | Bhat et al. |
| 5,990,862 A | 11/1999 | Lewis |
| 8,335,912 B2 | 12/2012 | Golla et al. |
| 9,026,302 B2 | 5/2015 | Stout et al. |
| 9,104,836 B2 | 8/2015 | Burstein et al. |
| 9,188,983 B2 | 11/2015 | Stout et al. |
| 9,473,496 B2 | 10/2016 | Burstein et al. |
| 9,747,009 B2 | 8/2017 | Jadhav et al. |
| 9,895,808 B2 | 2/2018 | Stout et al. |
| 9,967,709 B2 | 5/2018 | Patel et al. |
| 10,212,042 B2 | 2/2019 | Patel et al. |
| 10,296,219 B2 | 5/2019 | Wang et al. |

(Continued)

OTHER PUBLICATIONS

Mar. 11, 2025—(US) Notice of Allowance—U.S. Appl. No. 17/690,510.
Mar. 6, 2024—(US) Notice of Allowance—U.S. Appl. No. 17/683,802.

*Primary Examiner* — Kimberly L Wilson
(74) *Attorney, Agent, or Firm* — Banner & Witcoff, Ltd.

(57) ABSTRACT

Aspects of the disclosure relate to logical map generation and injection. A computing platform may train a key value engine to assign logical map data priority values based on data use cases. The computing platform may receive first data and a first use case, which the computing platform may input into the key value engine to produce the logical map data priority values for the first data. The computing platform may generate, based on the logical map data priority values, a logical map for the first data. The computing platform may modify the first data by embedding, into a header of the first data, the logical map. The computing platform may send, to a recipient computing device, a portion of the modified first data and one or more commands to re-assemble the first data using the logical map stored in the portion of the modified first data.

20 Claims, 8 Drawing Sheets

(56) References Cited

U.S. PATENT DOCUMENTS

| | | | |
|---|---|---|---|
| 10,409,511 B1 | 9/2019 | Subbarao et al. |
| 10,466,511 B2 | 11/2019 | Wen et al. |
| 10,466,929 B2 | 11/2019 | Byun |
| 10,583,562 B2 | 3/2020 | Stout et al. |
| 10,972,402 B1 | 4/2021 | Akash |
| 11,052,540 B2 | 7/2021 | Stout et al. |
| 11,164,115 B1 | 11/2021 | Todd et al. |
| 11,226,760 B2 | 1/2022 | Wang et al. |
| 12,051,073 B2 | 7/2024 | Gupta |
| 2014/0156847 A1 | 6/2014 | Moscibroda et al. |
| 2018/0232532 A1 | 8/2018 | Kurian et al. |
| 2022/0363302 A1 | 11/2022 | Wu |
| 2022/0398264 A1 | 12/2022 | Eloul et al. |
| 2024/0045848 A1 | 2/2024 | Subramanian Seshadri et al. |

PREDICTIVE VALUE ENGINE FOR LOGICAL MAP GENERATION AND INJECTION

CROSS-REFERENCE TO RELATED APPLICATION

This application is a continuation of U.S. Ser. No. 17/683,802 filed on Mar. 1, 2022, which is entitled "Predictive Value Engine For Logical Map Generation and Injection" which is incorporated by reference herein in its entirety.

BACKGROUND

Aspects of the disclosure relate to computing hardware and software, particularly distributed computing hardware and software configured for logical map generation. In some instances, information may be shared between devices, and/or stored at these devices. Storage and/or processing capabilities of these devices, however, may be different, and some devices might not be configured to store, host, or otherwise process a dataset in its entirety. Given the importance of transferring accurate and useful information, it may be important to facilitate such information sharing, while accommodating storage and/or processing constraints of various computing devices. Furthermore, it may be important to improve efficiency of addressing missing or otherwise corrupted information.

SUMMARY

Aspects of the disclosure provide effective, efficient, scalable, and convenient technical solutions that address and overcome the technical problems associated with prioritizing data for logical map generation. In accordance with one or more embodiments of the disclosure, a computing platform comprising at least one processor, a communication interface, and memory storing computer-readable instructions may train a key value engine to assign logical map data priority values based on one or more data use cases. The computing platform may receive first data and a first use case for the first data. The computing platform may input the first data and the first use case into the key value engine to produce the logical map data priority values for the first data. The computing platform may generate, based on the logical map data priority values, a logical map for the first data. The computing platform may modify the first data by embedding, into a header of the first data, the logical map. The computing platform may send, to a recipient computing device, a portion of the modified first data and one or more commands directing the recipient computing device to re-assemble the first data using the logical map stored in the portion of the modified first data, which may cause the recipient computing device to re-assemble the first data using the logical map stored in the portion of the modified first data. The computing platform may receive, from the recipient computing device, feedback information indicating accuracy of the re-assembled first data. The computing platform may update, based on the feedback information, the key value engine.

In one or more instances, training the key value engine may include using a supervised machine learning process to train the key value engine using a labelled dataset, where the labelled dataset includes: 1) initial data, 2) initial use case information defining the one or more data use cases, and 3) initial logical map data priority values indicating a degree of relevancy of each data point of the data for each of the one or more data use cases. In one or more instances, the logical map data priority values may include values between 1 and 10, where each of the logical map data priority values indicates a hierarchical level of the logical map to which the corresponding data point is located.

In one or more examples, the logical map data priority value of 1 may indicate data most relevant to a corresponding use case and the logical map data priority value of 10 may indicate data least relevant to the corresponding use case. In one or more examples, the computing platform may receive, from a destination computing device, a request for the first data. The computing platform may identify a data storage capacity of the destination computing device, where modifying the first data by embedding, into a header of the first data, the logical map may include embedding a portion of the logical map into the header of the first data based on the identified data storage capacity.

In one or more instances, the portion of the logical map may include elements of the logical map with logical map data priority values that meet or are below a priority threshold corresponding to the identified data storage capacity. In one or more instances, the computing platform may receive, from a destination computing device, a request for the first data, where the request for the first data may specify a priority threshold, where modifying the first data by embedding, into the header of the first data, the logical map may include embedding a portion of the logical map into the header of the first data, and where the portion of the logical map may include elements of the logical map with logical map data priority values that meet or are below the specified priority threshold.

In one or more examples, a different logical map may be produced for each use case corresponding to the first data. In one or more examples, the recipient computing device may display the re-assembled first data.

In one or more instances, displaying the re-assembled first data may include displaying one or more hotkey data values comprising placeholder data values, and selection of the one or more hotkey data values may prompt for authentication credentials to access a re-assembled first data value corresponding to the one or more hotkey data values. In one or more instances, the computing platform may store, using a distributed ledger, the logical map, where the recipient computing device may be configured to access the distributed ledger to re-assemble the first data using the logical map.

In one or more examples, the computing platform may dynamically adjust the logical map to remove or to include elements of the logical map based on data conditions of the logical map, the data conditions may include one or more of: storage capacity, data loss, or availability of new data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to filling data gaps using intelligent knowledge. For example, data may be aware of itself, but may include missing damaged, and/or corrupted. As an illustrative example, only eight pieces of a ten piece puzzle may be available.

Through learning from other sources, a system may create placeholders that allow it to fill gaps or missing pieces in a dataset (either zero value or a predicted, extrapolated value (e.g., developed through scoring)). For example, if all other values are 100, and two pieces of data are missing, the system may create a score that may be impacted with the missing gap. In these instances, the gap might not be zero because there may be a known value to replace. An engine may predict a value and then back-validate (e.g., a red pixel would not be placed in the middle of a blue sky). In some instances, cloned datasets may be leveraged to fill in the gaps.

These and other features are described in further detail below.

Figure 1A:
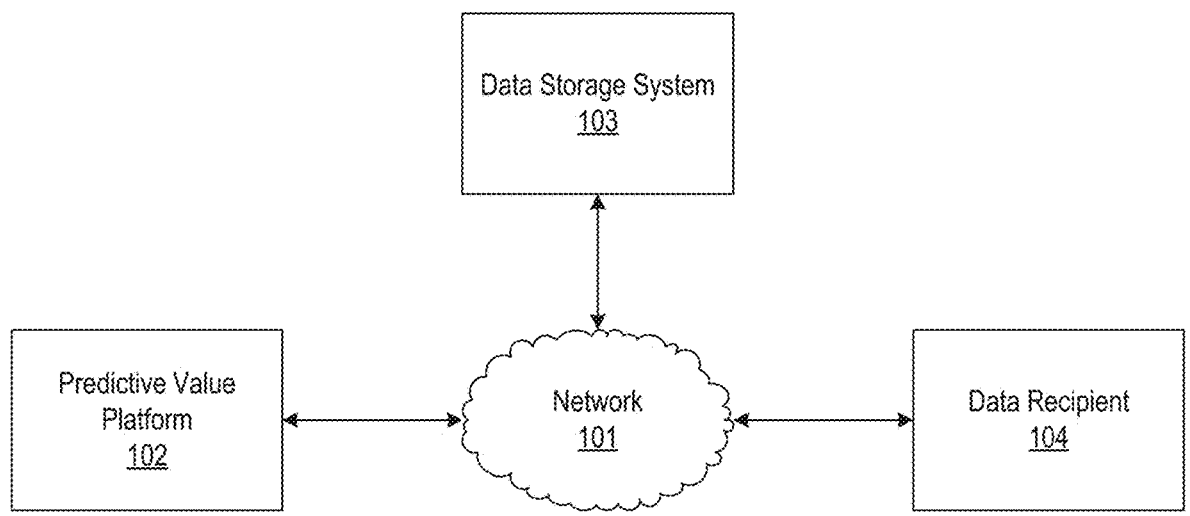
FIGS. 1A-1B depict an illustrative computing environment configured to provide improved information extrapolation using a predictive value engine for logical map generation and injection in accordance with one or more example embodiments.
Figure 1B:
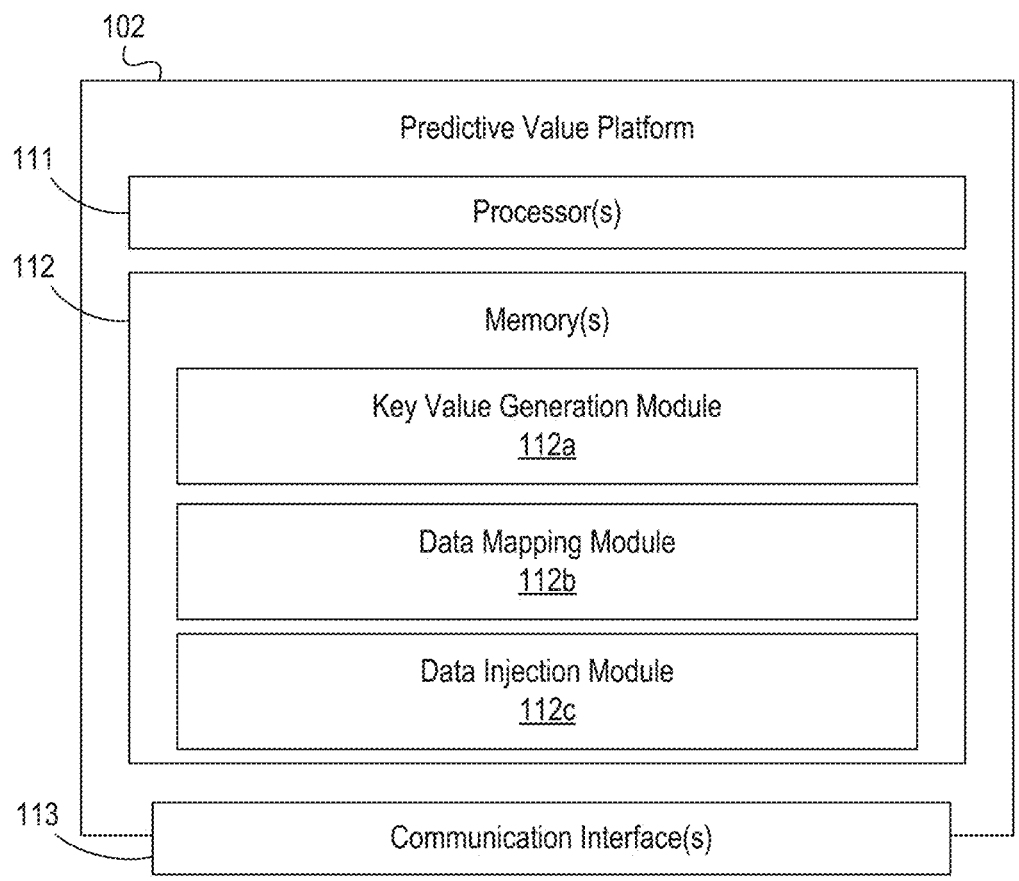

FIGS. 1A-1B depict an illustrative computing environment that provides improved information extrapolation using a predictive value engine for logical map generation and injection in accordance with one or more example embodiments. Referring to FIG. 1A, computing environment 100 may include one or more computer systems. For example, computing environment 100 may include predictive value platform 102, data storage system 103, and data recipient 104.

As described further below, predictive value platform 102 may be a computer system that includes one or more computing devices (e.g., servers, server blades, or the like) and/or other computer components (e.g., processors, memories, communication interfaces) that may be used for value prediction, logical map generation, logical map injection and/or other functions as described further below. In these instances, the predictive value platform 102 may be configured to train, host, and/or otherwise maintain a key value generation module 112a that may be used to dynamically assign relevancy values to data points based on corresponding use cases, which may, e.g., be used for logical map generation and/or to perform other functions.

Data storage system 103 may be and/or otherwise include one or more computing devices (e.g., servers, server blades, and/or other devices) and/or other computer components (e.g., processors, memories, communication interfaces) that may be used to store data requested and/or otherwise provided to one or more data recipients (e.g., data recipient 104). For example, data storage system 103 may be a data source that provides data to the predictive value platform 102, which may generate logical maps to represent the data accordingly.

Data recipient 104 may be and/or otherwise include one or more devices such as a laptop computer, desktop computer, mobile device, tablet, smartphone, and/or other personal computing device. Additionally or alternatively, the data recipient 104 may be and/or otherwise include one or more data storage devices such as servers, server blades, and/or other computing devices configured for data storage. In some instances, the data recipient 104 may be configured to access logical maps, provided within data received from the predictive value platform 102. In some instances, the data recipient 104 may be configured to extrapolate additional data that was not explicitly received, based on the logical maps. In some instances, data recipient 104 may be configured to display one or more graphical user interfaces (e.g., reconstructed data interfaces, and/or other interfaces).

Computing environment 100 also may include one or more networks, which may interconnect predictive value platform 102, data storage system 103, and/or data recipient 104. For example, computing environment 100 may include a network 101 (which may interconnect, e.g., predictive value platform 102, data storage system 103, data recipient 104).

In one or more arrangements, predictive value platform 102, data storage system 103, and/or data recipient 104 may be any type of computing device capable of sending and/or receiving requests and processing the requests accordingly. For example, predictive value platform 102, data storage system 103, data recipient 104, and/or the other systems included in computing environment 100 may, in some instances, be and/or include server computers, desktop computers, laptop computers, tablet computers, smart phones, and/or other devices that may include one or more processors, memories, communication interfaces, storage devices, and/or other components. As noted above, and as illustrated in greater detail below, any and/or all of predictive value platform 102, data storage system 103, and/or data recipient 104 may, in some instances, be special-purpose computing devices configured to perform specific functions.

Referring to FIG. 1B, predictive value platform 102 may include one or more processors 111, memory 112, and communication interface 113. A data bus may interconnect processor 111, memory 112, and communication interface 113. Communication interface 113 may be a network interface configured to support communication between predictive value platform 102 and one or more networks (e.g., network 101, or the like). Memory 112 may include one or more program modules having instructions that when executed by processor 111 cause predictive value platform 102 to perform one or more functions described herein and/or one or more databases that may store and/or otherwise maintain information that may be used by such program modules and/or processor 111. In some instances, the one or more program modules and/or databases may be stored by and/or maintained in different memory units of predictive value platform 102 and/or by different computing devices that may form and/or otherwise make up predictive value platform 102. For example, memory 112 may have, host, store, and/or include key value generation module 112a, data mapping module 112b, and/or data injection module 112c.

Key value generation module 112a may have instructions that direct and/or cause predictive value platform 102 to generate values indicating a level of detail or relevancy of a particular data point to a given use case, and may, in some instances, do so by setting, defining, and/or otherwise iteratively refining optimization rules and/or other parameters used by the key value generation module 112a and/or the predictive value platform 102. Data mapping module 112b may have instructions that direct and/or cause predictive value platform 102 to execute advanced techniques for logical map generation based on the key values, as discussed in greater detail below. Data injection module 112c may have instructions that direct and/or cause predictive value platform 102 to execute advanced techniques for injecting, into a given data element, the corresponding logical map, as discussed in greater detail below.

Figure 2A:
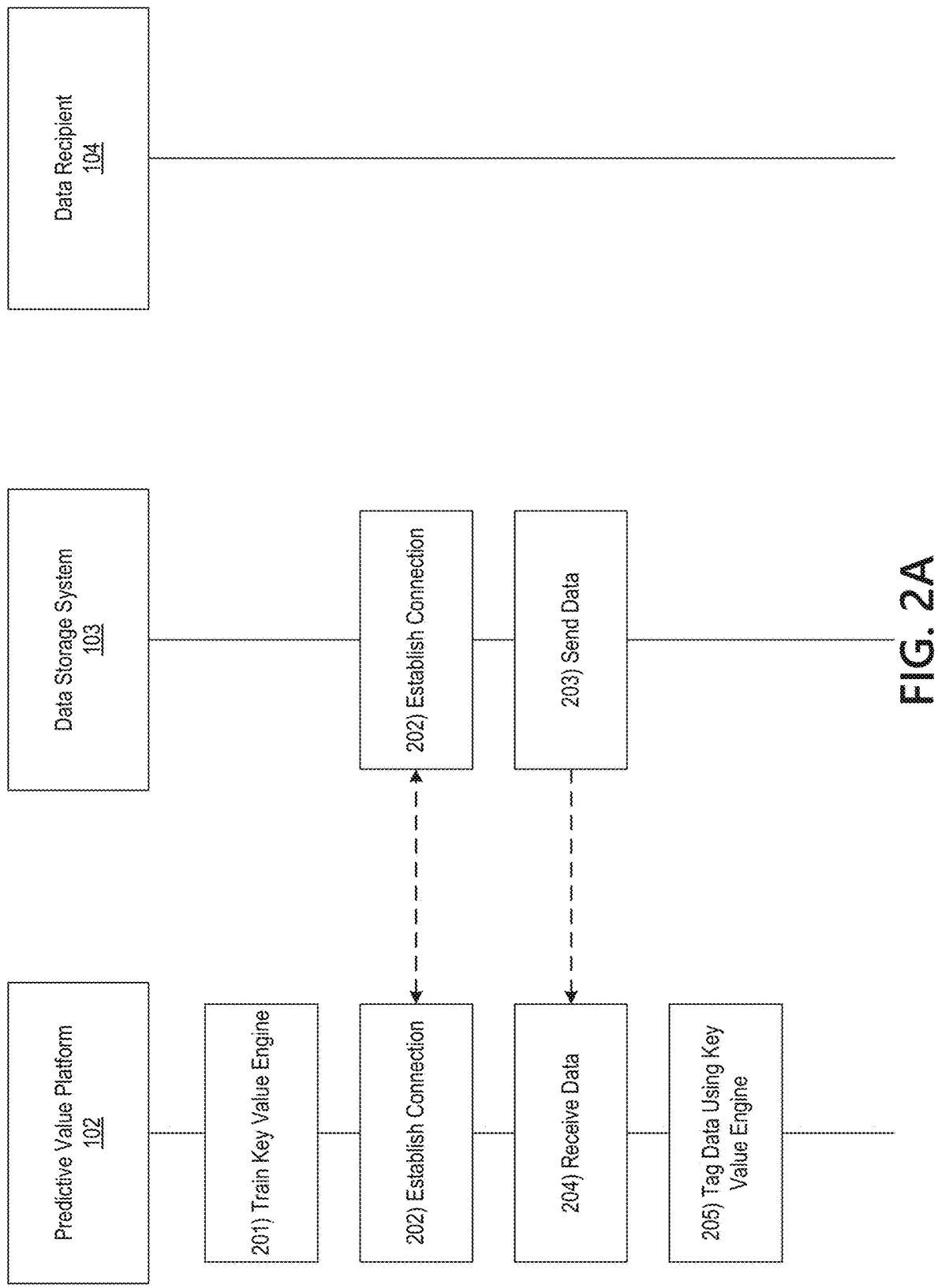
FIGS. 2A-2D depict an illustrative event sequence for improved information extrapolation using a predictive value engine for logical map generation and injection in accordance with one or more example embodiments.

FIGS. 2A-2D depict an illustrative event sequence for information extrapolation using a predictive value engine for logical map generation and injection in accordance with one or more example embodiments. Referring to FIG. 2A, at step 201, the predictive value platform 102 may train the key value generation module 112a. For example, the predictive value platform 102 may feed an initial dataset into the key value generation module 112a, in which each data element of the initial dataset is labelled with a key value (indicating a relevancy or level of detail for that data element in the context of one or more different use cases). For example, each data element may be labelled with multiple different key values (e.g., one per use case). In these instances, the use cases may correspond to a particular business need such as mortgage generation, recommending financial products, and/or providing other goods/services. In these instances, the predictive value platform 102 may train the key value generation module 112a using one or more supervised learning techniques such as support vector machines, linear regression, logistic regression, decision trees, nearest neighbor, neural networks, and/or other supervised learning algorithms. Additionally or alternatively, the predictive value platform 102 may feed the initial dataset into the key value generation module 112a, in which data elements of the initial dataset are not labelled with a key value. In these instances, the predictive value platform 102 may train the key value generation module 112a using one or more unsupervised learning techniques, such as clustering, anomaly detection, and/or other unsupervised learning techniques. In either scenario, the predictive value platform 102 may train the key value generation module 112a to output a key value based on input of a data element and a corresponding use case (or in some instances, the use case might not be input, and the key value generation module 112a may output a plurality of key values, each labelled with a corresponding use case). In these instances, the predictive value platform 102 may train the key value generation module 112a to automatically output a value indicative of a level of detail or relevancy for a data element for a given use case.

At step 202, the data storage system 103 may establish a connection with the predictive value platform 102. For example, the data storage system 103 may establish a first wireless data connection with the predictive value platform 102 to link the data storage system 103 to the predictive value platform 102 (e.g., in preparation for sending data elements). In some instances, the data storage system 103 may identify whether a connection is already established with the predictive value platform 102. If a connection is already established with the predictive value platform 102, the data storage system 103 might not re-establish the connection. If a connection is not yet established with the predictive value platform 102, the data storage system 103 may establish the first wireless data connection as described herein.

At step 203, the data storage system 103 may send one or more data elements to the predictive value platform 102. For example, the data storage system 103 may send the one or more data elements to the predictive value platform 102 while the first wireless data connection is established. In some instances, the data storage system 103 may send the one or more data elements to the predictive value platform 102 in response to a data request from the data recipient 104 and/or the predictive value platform 102, or the data storage system 103 may send the one or more data elements without being prompted to do so.

At step 204, the predictive value platform 102 may receive the one or more data elements sent at step 203. For example, the predictive value platform 102 may receive the one or more data elements via the communication interface 113 and while the first wireless data connection is established.

At step 205, the predictive value platform 102 may tag the one or more data elements or otherwise assign the one or more data elements with corresponding key values. For example, the predictive value platform 102 may input the one or more data elements into the key value generation module 112a, which may produce corresponding key values based on the above described training and initial dataset (e.g., by applying one or more supervised learning techniques, unsupervised learning techniques, and/or other techniques). As described above, in some instances, the predictive value platform 102 may output multiple key values for each of the one or more data elements (e.g., one for each use case). For example, a particular data element may have a different level of detail or relevancy for a first use case than for a second use case. In some instances, in outputting the key values, the predictive value platform 102 may output numeric values between 1 and 10, where 1 indicates the highest level of relevancy and/or lowest level of detail and 10 indicates the lowest level of relevancy and/or highest level of detail. As a particular example, the predictive value platform 102 may assign a value of 1 to an individual's name, a value of 2 to the individual's country, a value of 3 to the individuals state, a value of 4 to the individuals city/zip code, a value of 5 to the individuals street address, and a value of 10 to personal points of interest for the individual.

Figure 2B:
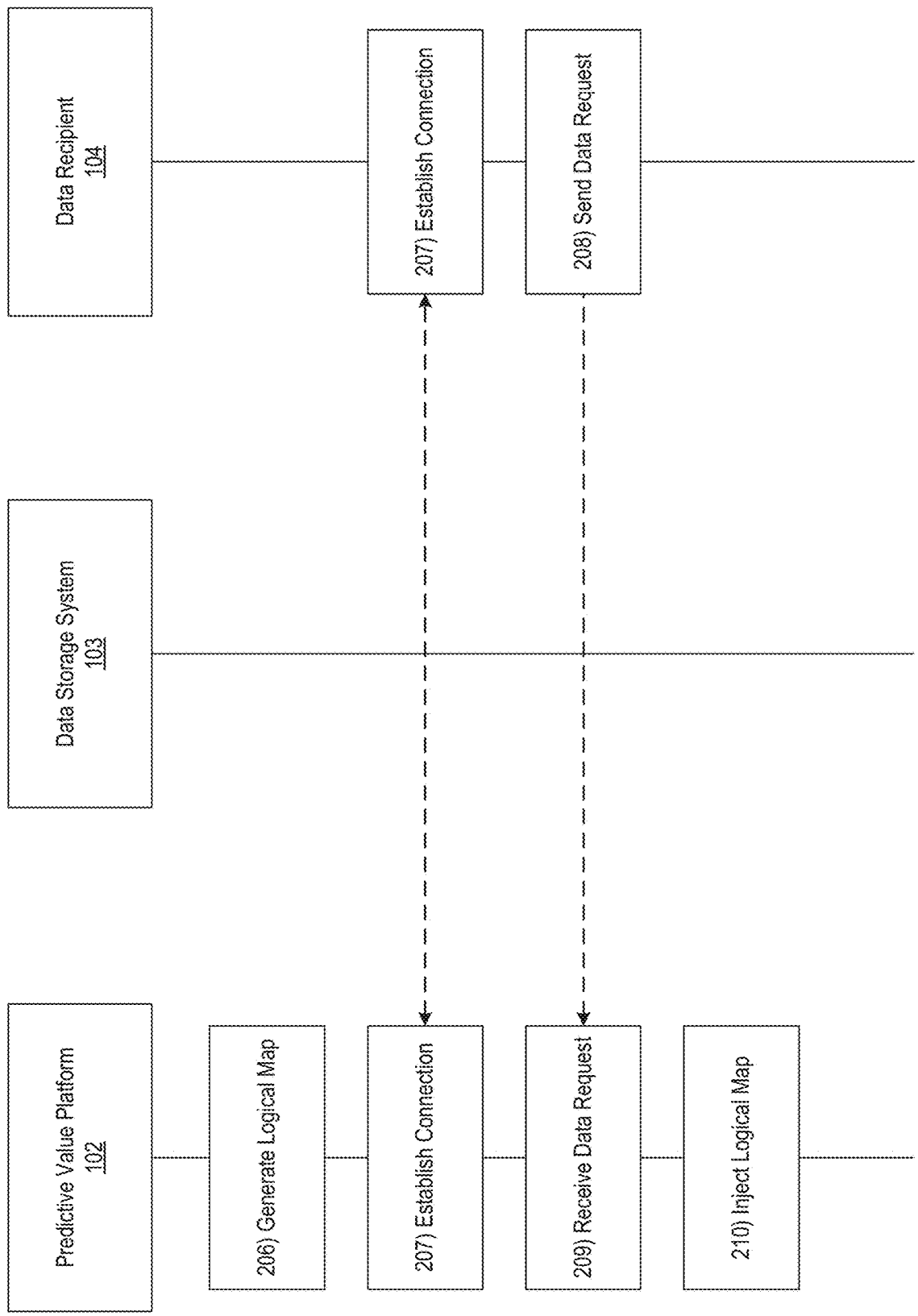

Referring to FIG. 2B, at step 206, the predictive value platform 102 may use the data mapping module 112b to generate a logical map for the one or more data elements based on the corresponding key values. For example, the predictive value platform 102 may assemble effectively a reverse pyramid data structure, where the most relevant and/or least detailed information (e.g., assigned a key value of 1) is located on the bottom (e.g., a first level), and the least relevant and/or least detailed information (e.g., assigned a key value of 10) is located on the top (e.g., a tenth level). In these instances, the predictive value platform 102 may assign the remaining data elements to levels of the logical map based on their corresponding key values. For example, each key value may comprise a logical map data priority value indicating a hierarchical level of the logical map to which a corresponding data element belongs. In doing so, the predictive value platform 102 may generate a logical map that groups data elements of similar relevancy/detail in common hierarchical levels. In some instances, the predictive value platform 102 may generate different logical maps for different use cases. To continue with the example described above, the predictive value platform 102 may map the individual's name to level 1, the individual's country to level 2, the individual's state to level 3, the individual's city/zip code to level 4, the individuals street address to level 5, and personal points of interest for the individual to level 10 of the logical map.

At step 207, the data recipient 104 may establish a connection with predictive value platform 102. For example, the data recipient 104 may establish a second wireless data connection with the predictive value platform 102 to link the data recipient 104 to the predictive value platform 102 (e.g., in preparation for sending a data request). In some instances, the data recipient 104 may identify whether a connection was already established with the predictive value platform 102. If a connection is already established with the predictive value platform 102, the data recipient 104 might not re-establish the connection. If a connection is not yet established with the predictive value platform 102, the data recipient 104 may establish the second wireless data connection as described herein.

At step 208, the data recipient 104 may send a data request to the predictive value platform 102. For example, the data recipient 104 may send the data request while the second wireless data connection is established. In some instances, in sending the data request, the data recipient 104 may specify specific data elements, a use case, and/or a threshold key value level for which data should be sent. For example, the data recipient 104 may request data elements related to a given use case that have key values in the logical map less than or equal to 5 (e.g., the data recipient 104 may request the name/address information, but not the personal points of interest information).

At step 209, the predictive value platform 102 may receive the data request sent at step 208. For example, the predictive value platform 102 may receive the data request via the communication interface 113 and while the second wireless data connection is established. In some instances, steps 208 and 209 may be optional, and the predictive value platform 102 may proceed to step 210 without receiving an explicit data request from the data recipient 104.

At step 210, the predictive value platform 102 may select a logical map corresponding to the request data and/or use case, and may inject (e.g., using the data injection module 112*c*) the logical map into the requested data to produce modified data. For example, the predictive value platform 102 may inject the logical map into a head, tail, and/or other field of the requested data. In some instances, the predictive value platform 102 may identify, based on the data request, properties of the data recipient (e.g., storage capacity, processing capacity, available storage resources, and/or other information), a threshold key value level of the selected logical map that should be injected. For example, the predictive value platform 102 may identify that only elements of the selected logical map corresponding to or less than level 5 should be included in the injected logical map. For example, the predictive value platform 102 may inject a logical map specific to the data recipient 104. Additionally or alternatively, the predictive value platform 102 may determine that the entire selected logical map should be injected, and that only a portion of the data, included in the logical map, should be sent as data elements (e.g., the logical map may then be used to extrapolate any unsent data elements). In some instances, such selective sending of data elements/logical maps may accommodate storage capacity of destination devices, rather than blindly sending an amount of data that exceeds processing or storage capabilities of such devices.

In some instances, in addition or as an alternative to injecting the logical map into the requested data, the predictive value platform 102 may store the logical map using a distributed ledger (e.g., blockchain, holo-chain, and/or other distributed ledger). In these instances, the predictive value platform 102 may modify a distributed ledger to include a new block, which may include the logical map. In doing so, the predictive value platform 102 may create an immutable ledger characterized by additional security measures in view of the distributed validation process used for such a distributed ledger.

Figure 2C:
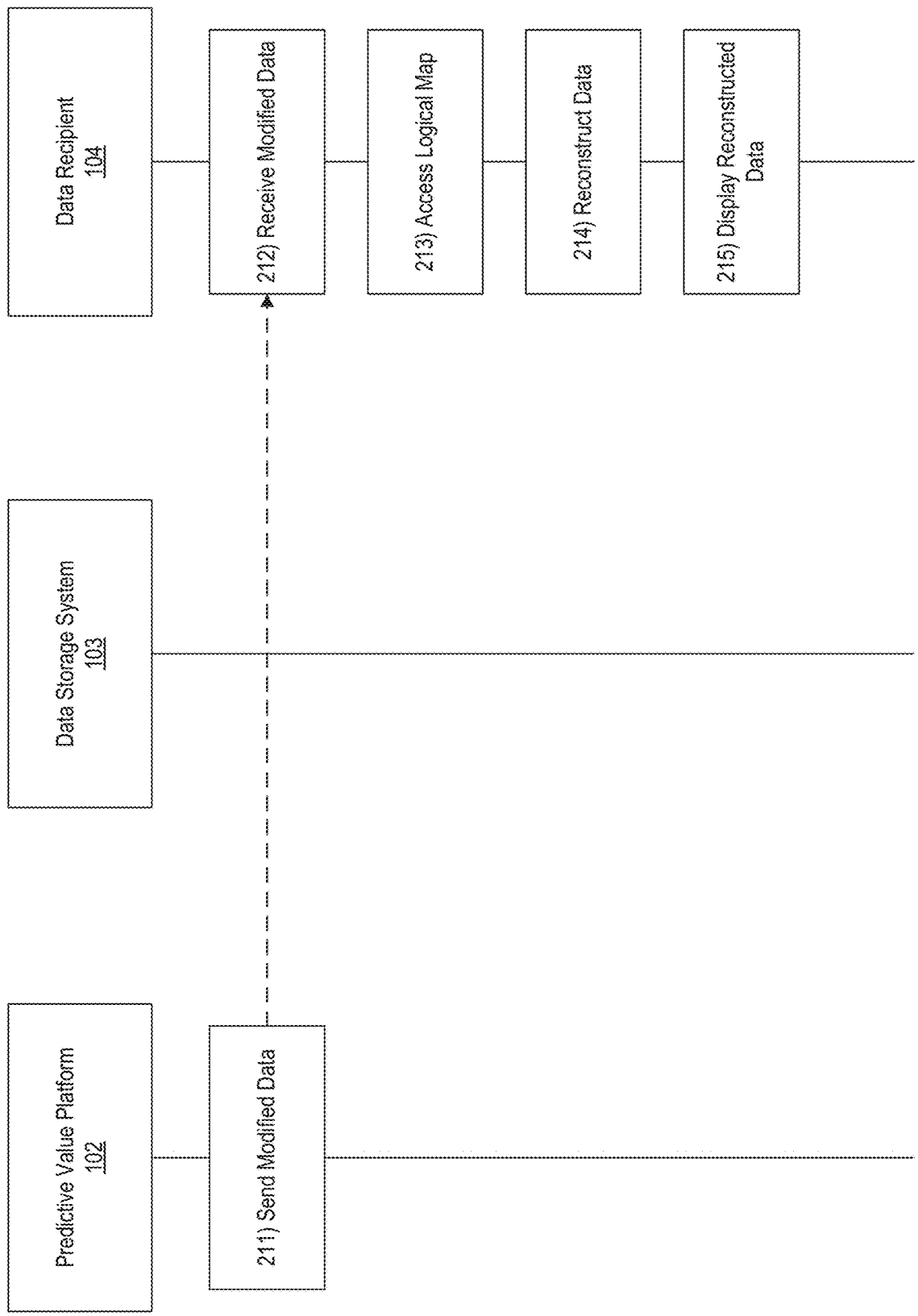

Referring to FIG. 2C, at step 211, the predictive value platform 102 may send the modified data to the data recipient 104. As mentioned above, in sending the modified data, the predictive value platform 102 may send only a portion of data related to a requested use case, data corresponding to a key value threshold, and/or other portion of data based on the data request, capabilities of the data recipient 104, and/or other parameters. Furthermore, in sending the modified data, the predictive value platform 102 may send data with the injected logical map (which may, e.g., include information of additional data, not explicitly sent to the data recipient 104). In some instances, this logical map may also include data corresponding to a key value threshold (e.g., the logical map may be included in whole or in part). In some instances, in sending the modified data, the predictive value platform 102 may replace one or more data elements with a placeholder value (e.g., a null value, or other placeholder value different than the replaced data element). In some of these instances, the placeholder value may be a hotkey, configured to prompt for additional authentication measures and to present the replaced data element upon presentation of valid authentication credentials. In some instances, in sending the placeholder value, the predictive value platform 102 may send a value that might not be distinguishable as a placeholder value (e.g., the placeholder value may be selected to blend in to the remaining data elements, and may be identified only by individuals previously aware of the placeholder value). This may provide an additional layer of security for the data elements. In some instances, the predictive value platform 102 may send the modified data via the communication interface 113 and while the second wireless data connection is established. In some instances, the predictive value platform 102 may also send one or more commands directing the data recipient 104 to reconstruct a full dataset using the modified data and the injected logical map.

At step 212, the data recipient 104 may receive the modified data sent at step 211. For example, the data recipient 104 may receive the modified data while the second wireless data connection is established. In some instances, the data recipient 104 may also receive the one or more commands directing the data recipient 104 to reconstruct a full dataset using the modified data and the injected logical map.

At step 213, the data recipient 104 may access the logical map from the modified data received at step 212. For example, the data recipient 104 may extract or otherwise access the logical map from the header or other field of the modified data, which may include information of additional data (not explicitly received from the predictive value platform 102), that may be used to derive this additional data based on the modified data and the logical map. For example, the data recipient 104 may access the logical map to initiate a data reconstruction process based on or in response to the one or more commands directing the data recipient 104 to reconstruct the full dataset.

In addition or as an alternative to accessing the logical map from a data field of the modified data, the data recipient 104 may access a distributed ledger on which the logical map is stored. In these instances, logical map access may be granted to the data recipient 104 based on approval by a quorum number of validators for the distributed ledger.

At step 214, the data recipient 104 may reconstruct the full dataset using the modified data and the logical map. For example, the data recipient 104 may have received an individual's name/address information, but not information of their personal places of interest. In this example, the personal places of interest information may be included in the logical map, and thus the data recipient 104 may derive such information from the header or other field of the modified data, and may extrapolate this information to effectively recreate the full dataset without explicitly receiving this information. As described above, in some instances, the data recipient 104 may access the logical map to reconstruct a full dataset (e.g., all data elements for a given use case) or a partial dataset (e.g., only data elements with corresponding key values/logical map levels that meet or fall below a predetermined threshold). For example, in some instances, the data recipient 104 may only reconstruct a portion of the dataset corresponding to logical map levels equal to or less than 5. In this example, the threshold may be specified by the data recipient 104 and/or users of the data recipient 104. This may provide technical benefits/efficiencies for the data recipient 104, because it may be able to derive or extrapolate additional data that need not be explicitly sent to the data recipient 104 (and thus might not need to be stored by or otherwise processed by the data recipient 104). Additionally, the data recipient 104 need not be aware of a source for the data (e.g., to request that lost or corrupted data be resent) or otherwise store backup data because all information needed to create or recreate the data may be stored in the logical map. Accordingly, such methods may be advantageous in the event of system corruption or other situations that prompt for data regeneration and/or for data gaps to be filed.

Furthermore, as indicated above, in reconstructing the data, the data recipient 104 may, in some instances, replace one or more data values with a placeholder value (which may, in some instances, be a hotkey value that may prompt for additional authentication credentials to access the replaced data values).

In some instances, once the data has been reconstructed, the data recipient 104 may back validate the reconstructed data to confirm accuracy of the reconstructed data. For example, if a single data element of one hundred data elements represents the color red, and the remaining ninety nine data elements represent the color blue, the data recipient 104 may identify that the extrapolated red data element represents an error. In these instances, the data recipient 104 may automatically correct the error and/or provide feedback to the predictive value platform 102 indicating the error.

At step 215, the data recipient 104 may display the reconstructed data. For example, the data recipient 104 may display a graphical user interface similar to graphical user interface 405, which may include both received data, and data derived from the logical map.

Figure 2D:
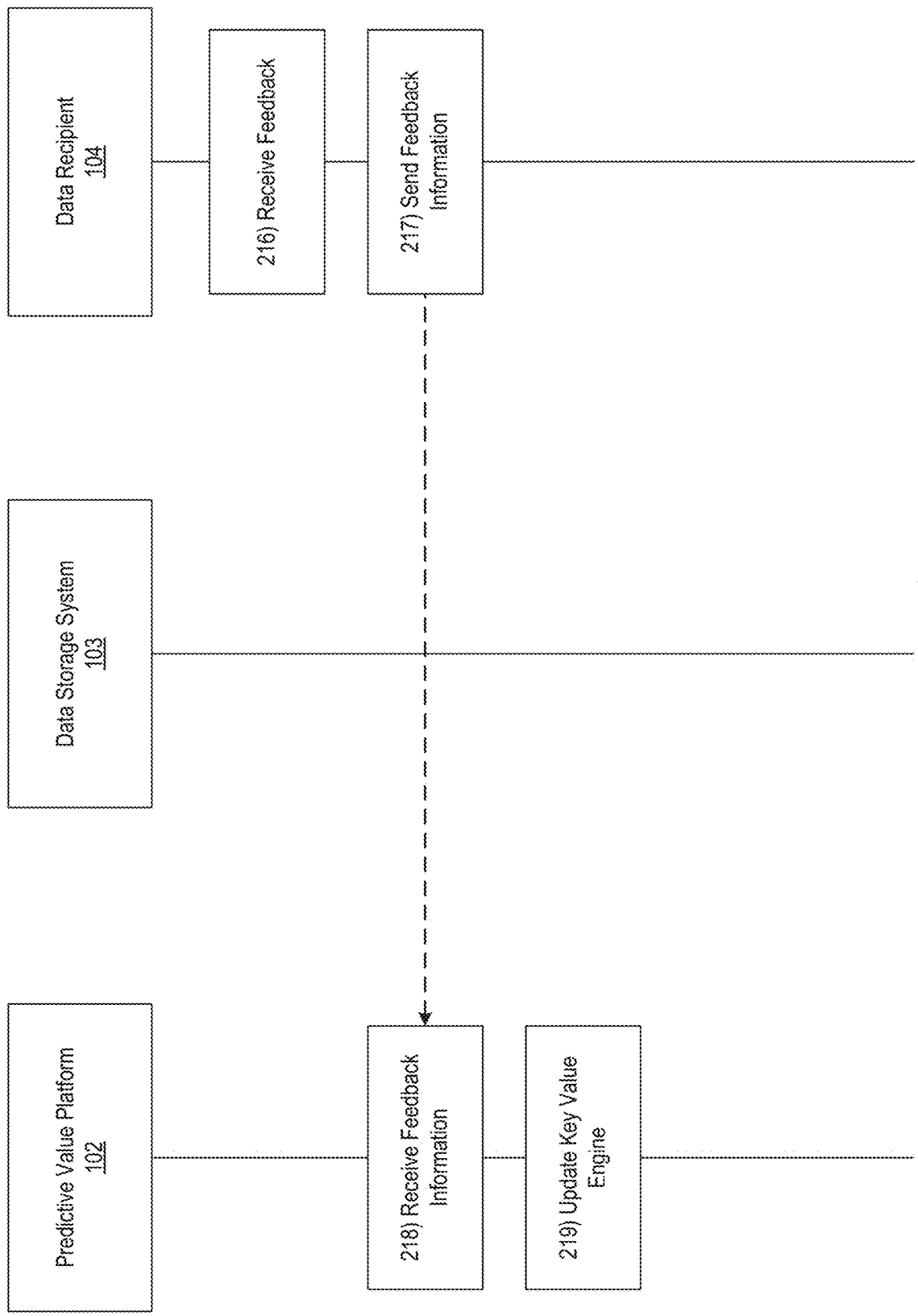

Referring to FIG. 2D, at step 216, the data recipient 104 may receive feedback regarding the reconstructed data. For example, the data recipient 104 may receive feedback indicating satisfaction with the received and/or extrapolated data, which may, e.g., be based on the key values predicted at step 205. Specifically, the data recipient 104 may receive feedback indicating that more, less, or the same amount of data should be received or otherwise extrapolated. Additionally or alternatively, the data recipient 104 may receive feedback indicating accuracy of the extrapolated data.

At step 217, the data recipient 104 may send feedback information, based on the received feedback, to the predictive value platform 102. For example, the data recipient 104 may send feedback information to the predictive value platform 102 while the second wireless data connection is established.

At step 218, the predictive value platform 102 may receive the feedback information sent at step 217. For example, the predictive value platform 102 may receive the feedback information via the communication interface 113 and while the second wireless data connection is established.

At step 219, the predictive value platform 102 may update the key value generation module 112a based on the feedback information. For example, the predictive value platform 102 may input the feedback information into the key value generation module 112a to establish a dynamic feedback loop based on feedback from the data recipient 104, which may be used to iteratively train, refine, and/or otherwise continuously improve the predictive qualities of the key value generation module. For example, if the predictive value platform 102 receives feedback indicating that more data should be received or extrapolated, the predictive value platform 102 may adjust the key value generation module 112a so as to lower the key values assigned to data elements or otherwise increase the key value threshold associated with data that is sent or otherwise included in the logical maps. Similarly, if the predictive value platform 102 receives feedback indicating that less data should be received or extrapolated, the predictive value platform 102 may adjust the key value generation module 112a so as to increase the key values assigned to data elements or otherwise decrease the key value threshold associated with data that is sent or otherwise included in the logical maps. If positive feedback is received, the predictive value platform 102 may feed this feedback into the key value generation module 112a so as to re-enforce the current predictive qualities.

Additionally or alternatively, the predictive value platform 102 may receive feedback information from other computing sources and/or may generate its own feedback based on monitoring the logical maps, which may indicate, for example, changing storage or processing capacity at one or more data recipients, loss/removal/deletion of data included in the logical maps, availability/addition of new data not yet included in the logical maps, and/or other data conditions. In these instances, the predictive value platform 102 may update the logical maps accordingly. For example, the predictive value platform 102 may identify that an amount of data in a given logical map that is no longer available, a rate of data deletion, and/or other data condition exceeds a threshold percentage of the amount of data included in that logical map (e.g., 10%). Based on identifying that this threshold percentage amount is exceeded, the predictive value platform 102 may update the logical map accordingly. Similarly, the predictive value platform 102 may identify that an amount of new data that is not yet included in a given logical map, a rate of data addition, and/or other data condition exceeds a threshold percentage of the amount of data included in that logical map (e.g., 10%). Based on identifying that this threshold percentage amount is exceeded, the predictive value platform 102 may update the logical map accordingly. Similarly, the predictive value platform 102 may identify that an amount of data transmitted in response to a request may be increased or decreased to improve processing capacity of the data recipient 104 (which may, in some instances, be due to changing capacities of the data recipient 104). In these instances, the predictive value platform 102 may adjust key value generation, data transmission, and/or logical maps accordingly to improve performance. In these instances, the predictive value platform 102 may inject a new logical map into the requested data, and push the update to the data recipient 104 and/or update the distributed ledger storing the logical map (which may, e.g., be accessed by the data recipient 104).

Figure 3:
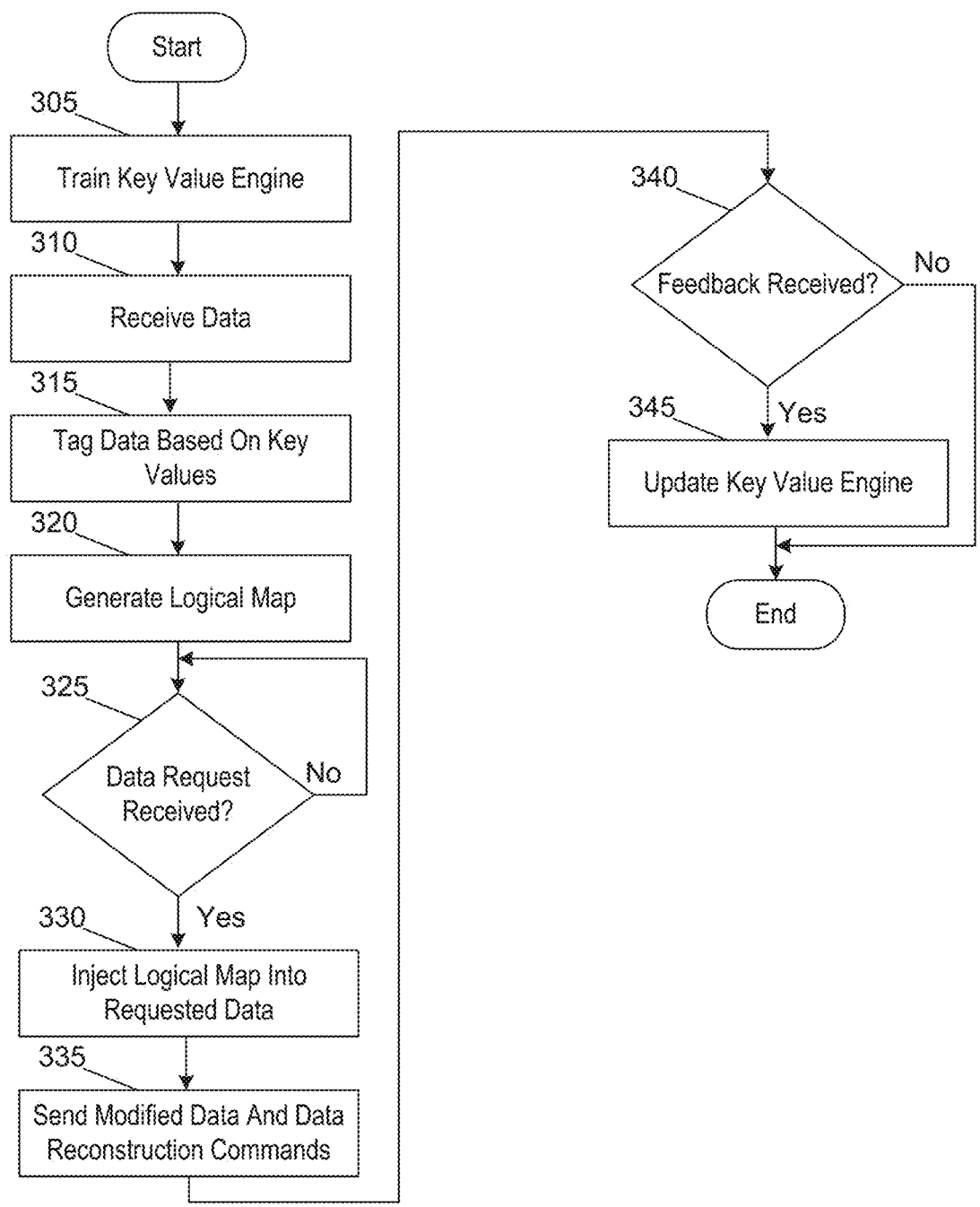
FIG. 3 depicts an illustrative method for improved information extrapolation using a predictive value engine for logical map generation and injection in accordance with one or more example embodiments.
Figure 4:
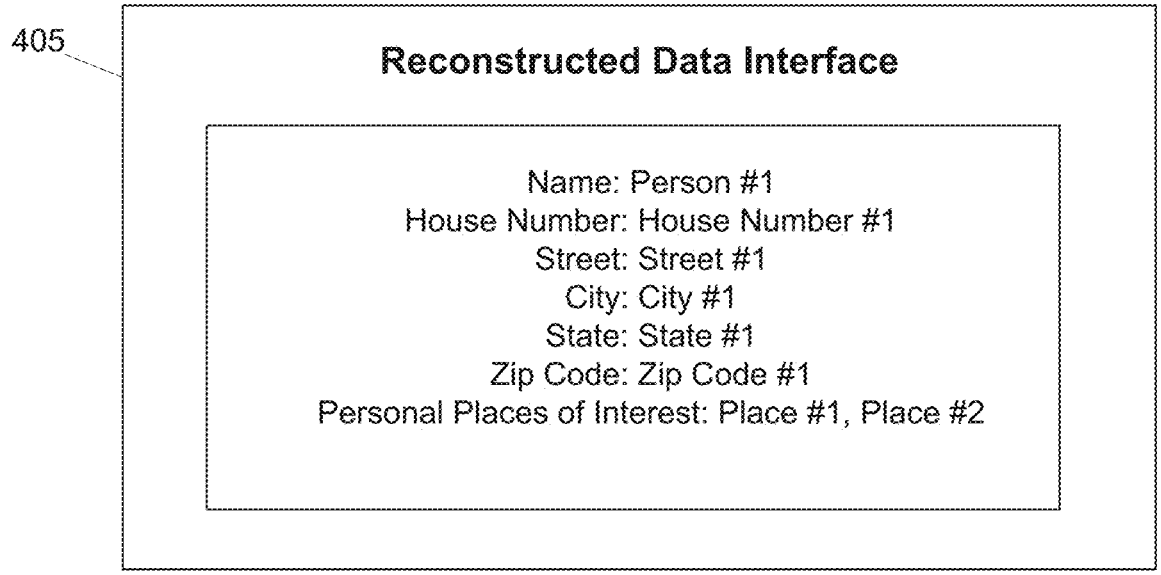
FIG. 4 depicts an illustrative graphical user interface associated with improved information extrapolation using a predictive value engine for logical map generation and injection in accordance with one or more example embodiments.

FIG. 3 depicts an illustrative method for information extrapolation using a predictive value engine for logical map generation and injection in accordance with one or more example embodiments. Referring to FIG. 3, at step 305, a computing platform having at least one processor, a communication interface, and memory may train a key value generation engine. At step 310, the computing platform may receive one or more data elements. At step 315, the computing platform may assign key values to the one or more data elements and tag the one or more data elements accordingly. At step 320, the computing platform may generate a logical map for the one or more data elements based on the key values. At step 325, the computing platform may identify whether or not a data request was received. If a data request was not received, the computing platform may return to step 325. If a data request was received, the computing platform may proceed to step 330.

At step 330, the computing platform may inject the logical map into the requested data. At step 335, the computing platform may send the modified data and one or more data reconstruction commands to a data recipient device. At step 340, the computing platform may identify whether or not feedback was received from the data recipient device. If feedback was not received, the method may end. If feedback was received, the computing platform may proceed to step 345. At step 345, the computing platform may update the key value generation engine accordingly.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
train a key value engine to assign logical map data priority values based on one or more data use cases;
input first data and a first use case for the first data into the key value engine to produce the logical map data priority values for the first data;
generate, based on the logical map data priority values, a logical map for the first data;
modify the first data by embedding, into a header of the first data, the logical map; and send, to a recipient computing device, a portion of the modified first data and one or more commands directing the recipient computing device to re-assemble the first data using the logical map stored in the portion of the modified first data, wherein sending the one or more commands directing the recipient computing device to re-assemble the first data using the logical map stored in the portion of the modified first data causes the recipient computing device to re-assemble the first data using the logical map stored in the portion of the modified first data.

2. The computing platform of claim 1, wherein training the key value engine comprises using a supervised machine learning process to train the key value engine using a labelled dataset, wherein the labelled dataset includes:
initial data,
initial use case information defining the one or more data use cases, and
initial logical map data priority values indicating a degree of relevancy of each data point of the data for each of the one or more data use cases.

3. The computing platform of claim 1, wherein the logical map data priority values comprise values between 1 and 10, wherein each of the logical map data priority values indicates a hierarchical level of the logical map to which the corresponding data point is located.

4. The computing platform of claim 3, wherein the logical map data priority value of 1 indicates data most relevant to a corresponding use case and the logical map data priority value of 10 indicates data least relevant to the corresponding use case.

5. The computing platform of claim 1, wherein the memory stores additional computer-readable instructions that, when executed by the at least one processor, cause the computing platform to:
receive, from a destination computing device, a request for the first data; and
identify a data storage capacity of the destination computing device, wherein modifying the first data by embedding, into a header of the first data, the logical map comprises embedding a portion of the logical map into the header of the first data based on the identified data storage capacity.

6. The computing platform of claim 5, wherein the portion of the logical map comprises elements of the logical map with logical map data priority values that meet or are below a priority threshold corresponding to the identified data storage capacity.

7. The computing platform of claim 1, wherein the memory stores additional computer-readable instructions that, when executed by the at least one processor, cause the computing platform to:
receive, from a destination computing device, a request for the first data, wherein the request for the first data specifies a priority threshold, wherein modifying the first data by embedding, into the header of the first data, the logical map comprises embedding a portion of the logical map into the header of the first data, wherein the portion of the logical map comprises elements of the logical map with logical map data priority values that meet or are below the specified priority threshold.

8. The computing platform of claim 1, wherein a different logical map is produced for each use case corresponding to the first data.

9. The computing platform of claim 1, wherein the recipient computing device displays the re-assembled first data.

10. The computing platform of claim 1, wherein displaying the re-assembled first data comprises displaying one or more hotkey data values comprising placeholder data values, and wherein selection of the one or more hotkey data values prompts for authentication credentials to access a re-assembled first data value corresponding to the one or more hotkey data values.

11. The computing platform of claim 1, wherein the memory stores additional computer-readable instructions that, when executed by the at least one processor, cause the computing platform to:
store, using a distributed ledger, the logical map, wherein the recipient computing device is configured to access the distributed ledger to re-assemble the first data using the logical map.

12. The computing platform of claim 1, wherein the memory stores additional computer-readable instructions that, when executed by the at least one processor, cause the computing platform to:
dynamically adjust the logical map to remove or to include elements of the logical map based on data conditions of the logical map, wherein the data conditions comprise one or more of:
storage capacity, data loss, or availability of new data.

13. The computing platform of claim 1, wherein the memory stores additional computer-readable instructions that, when executed by the at least one processor, cause the computing platform to:
receive the first data and the first use case for the first data.

14. The computing platform of claim 1, wherein the memory stores additional computer-readable instructions that, when executed by the at least one processor, cause the computing platform to:
receive, from the recipient computing device, feedback information indicating accuracy of the re-assembled first data; and
update, based on the feedback information, the key value engine.

15. A method comprising:
at a computing platform comprising at least one processor, a communication interface, and memory:
training a key value engine to assign logical map data priority values based on one or more data use cases;
inputting first data and a first use case for the first data into the key value engine to produce the logical map data priority values for the first data;
generating, based on the logical map data priority values, a logical map for the first data;
modifying the first data by embedding, into a header of the first data, the logical map; and
sending, to a recipient computing device, a portion of the modified first data and one or more commands directing the recipient computing device to re-assemble the first data using the logical map stored in the portion of the modified first data, wherein sending the one or more commands directing the recipient computing device to re-assemble the first data using the logical map stored in the portion of the modified first data causes the recipient computing device to re-assemble the first data using the logical map stored in the portion of the modified first data.

16. The method of claim 15, wherein training the key value engine comprises using a supervised machine learning process to train the key value engine using a labelled dataset, wherein the labelled dataset includes:
initial data, initial use case information defining the one or more data use cases, and initial logical map data priority values indicating a degree of relevancy of each data point of the data for each of the one or more data use cases.

17. The method of claim 15, wherein the logical map data priority values comprise values between 1 and 10, wherein each of the logical map data priority values indicates a hierarchical level of the logical map to which the corresponding data point is located.

18. The method of claim 17, wherein the logical map data priority value of 1 indicates data most relevant to a corresponding use case and the logical map data priority value of 10 indicates data least relevant to the corresponding use case.

19. The method of claim 15, further comprising:

receiving, from a destination computing device, a request for the first data; and identifying a data storage capacity of the destination computing device, wherein modifying the first data by embedding, into a header of the first data, the logical map comprises embedding a portion of the logical map into the header of the first data based on the identified data storage capacity.

20. One or more non-transitory computer-readable media storing instructions that, when executed by a computing platform comprising at least one processor, a communication interface, and memory, cause the computing platform to:

train a key value engine to assign logical map data priority values based on one or more data use cases;

input first data and a first use case for the first data into the key value engine to produce the logical map data priority values for the first data;

generate, based on the logical map data priority values, a logical map for the first data;

modify the first data by embedding, into a header of the first data, the logical map; and send, to a recipient computing device, a portion of the modified first data and one or more commands directing the recipient computing device to re-assemble the first data using the logical map stored in the portion of the modified first data, wherein sending the one or more commands directing the recipient computing device to re-assemble the first data using the logical map stored in the portion of the modified first data causes the recipient computing device to re-assemble the first data using the logical map stored in the portion of the modified first data.

\* \* \* \* \*